United States Patent
Reina et al.

(10) Patent No.: US 9,660,770 B2
(45) Date of Patent: May 23, 2017

(54) FRAMING SCHEME AND METHOD FOR DIGITAL COMMUNICATION OVERHEAD AND LATENCY REDUCTION

(71) Applicant: Sckipio Technologies S.I LTD, Ramat Gan (IL)

(72) Inventors: Guy Reina, Givatayim (IL); Rami Verbin, Tel Aviv (IL); Ron Sterenson, Raanana (IL)

(73) Assignee: Sckipio Technologies S.I Ltd, Ramat Gan (IL)

( * ) Notice: Subject to any disclaimer, the term of this patent is extended or adjusted under 35 U.S.C. 154(b) by 0 days.

(21) Appl. No.: 14/387,924

(22) PCT Filed: Mar. 28, 2013

(86) PCT No.: PCT/IB2013/052502
§ 371 (c)(1),
(2) Date: Sep. 25, 2014

(87) PCT Pub. No.: WO2013/144905
PCT Pub. Date: Oct. 3, 2013

(65) Prior Publication Data
US 2015/0043595 A1    Feb. 12, 2015

Related U.S. Application Data (60) Provisional application No. 61/805,803, filed on Mar. 27, 2013, provisional application No. 61/693,880, (Continued)

(51) Int. Cl.
H04J 3/16 (2006.01)
H04L 1/18 (2006.01)
(Continued)

(52) U.S. Cl.
CPC .......... H04L 1/1854 (2013.01); H04L 1/1874 (2013.01); H04L 5/0055 (2013.01); H04L 5/1469 (2013.01)

(58) Field of Classification Search
None
See application file for complete search history.

(56) References Cited

U.S. PATENT DOCUMENTS 8,125,949 B1 * 2/2012 Dinan ................. H04J 13/0044
370/203
9,179,475 B2 * 11/2015 Koleszar ................. H04L 45/32
(Continued)

FOREIGN PATENT DOCUMENTS

EP    1072135 B1    1/2001
EP    2222011 A2    8/2010
(Continued)

OTHER PUBLICATIONS

International Search Report and Written Opinion for International Application No. PCT/IB2013/052502 (9 pages).
(Continued)

*Primary Examiner* — Michael J Moore, Jr.
(74) *Attorney, Agent, or Firm* — Brown Rudnick LLP (57) ABSTRACT

A data communication framing scheme of a bit stream that is divided among a plurality of discrete physical frames, each physical frame is of a definite number of symbols in duration, each symbol is associated with at least one sub-carrier in a plurality of sub-carriers, the physical frame is partitioned in time into at least an uplink zone and a downlink zone, the data framing scheme comprising a logical frame having a logical frame start position that is offset by a rational number of said symbols from a reference symbol, said reference symbol is selected from said definite number of symbols, wherein said logical frame extends in time to coincide with at least part of the duration of said
(Continued)

physical frame and at least part of the duration of another physical frame in said plurality of discrete physical frames.

12 Claims, 6 Drawing Sheets

Related U.S. Application Data filed on Aug. 28, 2012, provisional application No. 61/617,110, filed on Mar. 29, 2012.

(51) Int. Cl.
*H04L 5/00* (2006.01)
*H04L 5/14* (2006.01)

(56) References Cited

U.S. PATENT DOCUMENTS

| | | | |
|---|---|---|---|
| 2010/0278123 A1 | 11/2010 | Fong et al. | |
| 2011/0116485 A1* | 5/2011 | Olszewski | H04L 1/0083 370/338 |
| 2012/0069869 A1* | 3/2012 | Jeong | H04L 12/40013 375/132 |

FOREIGN PATENT DOCUMENTS

| | | |
|---|---|---|
| WO | 2006047851 A1 | 5/2006 |
| WO | 2009091931 A1 | 7/2009 |

OTHER PUBLICATIONS

Considerations for UL MAP Overhead Reduction. IEEE 802.16 Broadband Wireless Access Working Group. Retrieved from the Internet: <URL:http://www.ieee802.org/16/maint/contrib/C80216maint-07_053.pdf (Bourlas, Y. et al.) Nov. 30, 2007 (Nov. 30, 2007) Sections 5&6.

Extended European Search Report mailed Dec. 3, 2015, for European Patent Application No. 13770039.9 (7 Pages).

Sony Corporation: "Transmission Timing for Uplink Signalling", 3GPP Draft; 12A10067, 3rd Generation Partnership Project (3GPP), Jan. 28, 2002 (5 Pages).

ZTE: "Consideration on UL Access Link in LTE-A FDD System", 3GPP Draft; R1-092470_UL Relayaccesslink, 3rd Generation Partnership Project (3GPP), Jun. 23, 2009 (7 Pages).

* cited by examiner

FRAMING SCHEME AND METHOD FOR DIGITAL COMMUNICATION OVERHEAD AND LATENCY REDUCTION

FIELD OF THE DISCLOSED TECHNIQUE

The disclosed technique relates to the field of digital communications, in general, and to a data transmission framing scheme and method for overhead and latency reduction, in particular.

BACKGROUND OF THE DISCLOSED TECHNIQUE

Optical fibers are known to provide a greater data-carrying capacity, as well as exceptional immunity to crosstalk in comparison to electrical transmission lines, such as twisted-pair copper wires. Fiber to the x (FTTx or FTTX), where x can stand for building, business (FTTB), home (FTTH), neighborhood (FTTN), and the like, is a generalized generic term referring to broadband network communication architecture that employs optical fiber as a substitute, whether completely or in part, to the traditional metal (e.g., typically copper) cabling (e.g., coax, twisted pair) infrastructure used over "last-mile" telecommunications to the end-user. Although, FTTx technology inherently offers faster download and upload speeds in comparison to copper wire technology for the delivery of telephone and broadband services, deployment of fiber in the last few hundred meters accounts for the majority of overall cost as well as it being a time-consuming effort. Communication operators therefore strive to deploy fiber increasingly closer to the end-user, while concurrently bridging the troublesome remaining distance via copper wire technologies over the existing infrastructure. One of such technologies is G.fast (Fast Access to Subscriber Terminals), which enables communication operators to offer fiber-like speeds (e.g., 1 Gbps) to end-users without incurring the expenditures involved in wholly deploying FTTx.

To allow for ever faster data rates on last-mile copper infrastructure the data link layer has to be compatible with the constraints imposed by the physical layer. The physical layer comprises the fundamental networking hardware (i.e., electrical, optical, mechanical, etc.) and various other characteristics (i.e., broadcast frequencies, modulation schemes, etc.) required for data transmission and reception between network entities in a network. Essentially, the physical layer is concerned with conveying raw bits over a communication channel. These raw bits are typically in the form of a bit stream (i.e., a sequence of bits) that are grouped into symbols and that are converted to a physical signal to be transmitted over a transmission medium, such that the physical layer bears this bit stream toward a destination. This stream of raw bits, however, is not necessarily error free when received at the destination.

The data link layer (i.e., also termed link layer) is involved with the task to provide the means to transfer data between the network entities, to detect errors appearing at the physical layer as well as to possibly correct them. This task is accomplished, in part, by having the sender partition data into discrete frames of specified size which are transmitted sequentially to a receiver. A 'frame' is a unit of information (e.g., a data transmission unit (DTU)) that is conveyed across a data link. In general, there are information frames employed for the transfer of message data and control frames employed for link management. A DTU includes a sequence of symbols (i.e., one or more bits) allowing for the receiver to discern the beginning and end in the stream of symbols (i.e., commonly known as 'frame synchronization').

Naturally, there is a limited amount of data that can be transmitted or received per frame over a given amount of time; this is generally characterized by what is known as bandwidth. There are various schemes that are employed to allocate bandwidth, among which is time division duplexing (TDD). In TDD, frames are periodically sent from a base station to a receiver. Basically, each frame includes time slots that are allocated and collectively grouped for downstream (downlink) traffic as well those for upstream (uplink) traffic, such that a guard time separates downstream and upstream groups. In essence, TDD allows for a common carrier to be shared among the downlink and uplink, while the resource is switched in time. Prior to transmission of the frames, the transmitter computes a checksum for each frame. The receiver receives the frames and recomputes the checksum so as to determine whether an error has occurred in a particular frame. Error-correcting codes may be employed (i.e., often referred to as forward error correction (FEC)), where there is enough redundant information within each block of data that enables the receiver to determine that an error occurred. The receiver carries the task of either confirming correct receipt of a transmitted frame (e.g., via FEC) by sending back to the transmitter, via a control channel, an acknowledgement (ACK) frame, or sending a negative (NACK) acknowledgment frame, in case the transmitted frame contained errors or was not properly received (the erred frame is discarded). When the transmitter receives a NACK signal from the receiver indicating an ill-received or erred frame, the transmitter is assigned the task of retransmitting (typically immediately) the erred frame to the receiver during the following downlink frame.

Figure 1:
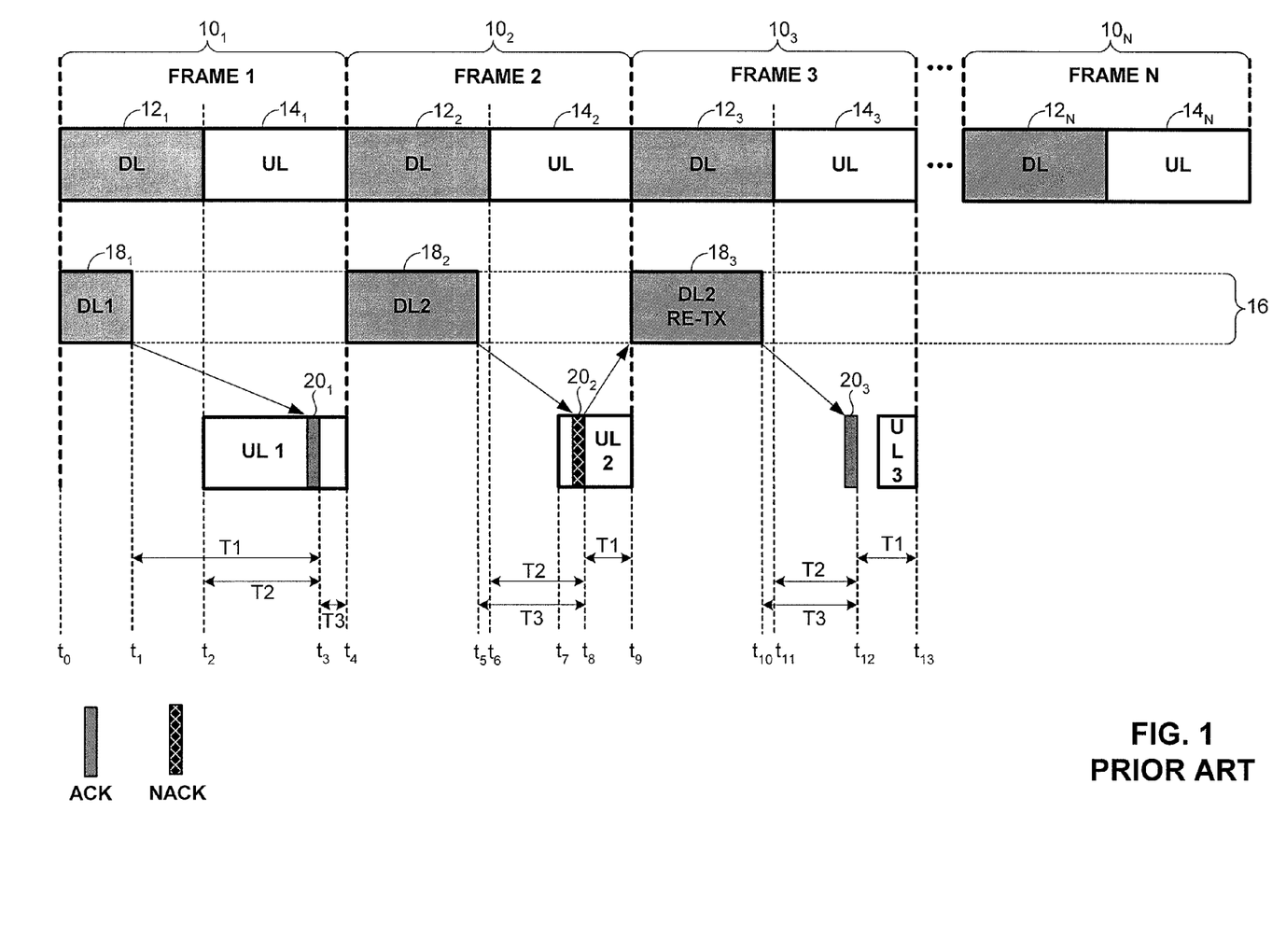
FIG. 1 is a schematic illustration of an immediate retransmission sequence, which is prior art.

Reference is now made to FIG. 1, which is a schematic illustration of an immediate retransmission sequence, which is prior art. FIG. 1 illustrates a prior art downlink retransmission mechanism in time presenting a bit stream partitioned into a plurality of N frames $10_1, 10_2, 10_3, \ldots, 10_N$ (where N is an integer) that extend horizontally as a function of time. Without loss of generality, a downlink retransmission mechanism is hereby selected to be described nonetheless a similar schematic illustration for an uplink retransmission mechanism may also be described. Basically, the depicted mechanism employs TDD to facilitate retransmission of erred transmissions that occur in a particular frame (i.e., represented as blocks) in the following frame. Each frame includes its respective downlink zone and uplink zone. Specifically, frame 1 (i.e., $10_1$) includes downlink zone $12_1$ and uplink zone $14_1$, frame 2 (i.e., $10_2$) includes downlink zone $12_2$ and uplink zone $14_2$, frame 3 (i.e., $10_3$) includes downlink zone $12_3$ and uplink zone $14_3$, and so forth to frame N (i.e., $10_N$) which includes downlink zone $12_N$ and uplink zone $14_N$).

It is herein assumed that in order to allow for substantially efficient operation the downlink (uplink) control channel that carries the ACK/NACK signal employs a pre-assigned uplink (downlink respectively) bandwidth with the remaining uplink (downlink respectively) used for data transmission. Suppose a transmitter (not shown) transmits a transmission $18_1$ to a receiver (not shown) via a transmission channel 16 at $t_0$ within the allocated downlink zone $12_1$. The receiver receives transmission $18_1$ starting at $t_2$ within the allocated uplink zone $14_1$ and generates an ACK signal $20_1$ thus indicating to the transmitter that transmission $18_1$ was properly received without errors. Let us denote by $T_3$ the time available for the generation of either one of an ACK or NACK (ACK/NACK) signal. Let $T_2$ denote the time required for the generation of ACK/NACK symbols and let $T_1$ denote the time required for the receiver to react to a retransmission request. Suppose now that the transmitter transmits a transmission $18_2$ to the receiver via transmission channel 16 from starting time $t_4$ to end time $t_5$ within the allocated uplink zone $12_2$. The receiver receives transmission $18_2$ at $t_6$ and determines that an error has occurred in the transmission and in response, generates a NACK signal $20_2$ that is relayed back to the transmitter at $t_8$. In response, the transmitter retransmits transmission $18_2$ starting at $t_9$ as a new transmission $18_3$ within downlink zone $12_3$. Now the receiver correctly receives download transmission $18_3$ and generates ACK signal $20_3$, accordingly.

From FIG. 1, it can be seen that as long as the time period for the each uplink zone (e.g., $14_2$) is longer than the sum of $T_1+T_2$ the downlink retransmission is immediate (i.e., is sent in the next frame (e.g., frame 3)). If, however, the uplink zone (e.g., $14_2$) is shorter than the sum of $T_1+T_2$ the retransmission may be delayed by one or more frames. Given the inherent limited time allocated for the uplink zone, such delays in retransmission to multiple succeeding frames are compounded in time for each respective retransmission thereby imposing high retransmission buffering requirements thus contributing to greater system overhead and latency.

SUMMARY OF THE PRESENT DISCLOSED TECHNIQUE

It is an object of the disclosed technique to provide a novel data communication framing scheme and method for framing a bit stream. The framing scheme and method employs logical frames, which are offset with respect to the beginning of respective physical frames, thereby relaxing constraints imposed by timing requirements of acknowledgement/negative-acknowledgement (ACK/NACK) transmissions while only moderately increasing the size of retransmission buffers, thereby reducing system overhead and latency.

In accordance with the disclosed technique, there is thus provided a data communication framing scheme for framing a bit stream, where it is assumed that this bit stream is divided among a plurality of discrete and sequenced physical frames and that each physical frame is of a definite number of symbols in duration. Each symbol is associated with at least one sub-carrier in a plurality of sub-carriers. The physical frame is partitioned in time into at least an uplink zone and a downlink zone.

According to one aspect of the disclosed technique, logical frames are defined. Particularly, the framing scheme allocates a logical frame in the bit stream, the former having a logical frame start position that is offset by a rational number of symbols from a reference symbol. The reference symbol is one which is selected from the definite number of symbols of the physical frame. The logical frame extends in time to coincide with at least part of the duration of the physical frame and at least part of the duration of another (i.e., either a subsequent physical frame in case the logical frame is positively offset in time or a previous physical frame in case the logical frame is negatively offset in time).

According to another aspect to the disclosed technique, a media access protocol (MAP) context frame, is defined and allocated in the bit stream. The MAP context frame has a MAP context frame start position that is offset by a rational number (i.e., typically integer) of symbols from the reference symbol within the physical frame. The framing scheme and method provides and defines a MAP message which precedes the MAP context frame. The MAP message includes at least one reference data type (e.g., a pointer) that respectively defines (i.e., references, points, etc.) a logical frame sub-carrier offset in relation to the sub-carrier associated with the reference symbol, as well as the logical frame start position.

According to a further aspect of the disclosed technique, an ACK/NACK context frame is defined and allocated in the bit stream. The ACK/NACK context frame has an ACK/NACK context frame start position that is offset by a rational number (i.e., typically integer) of symbols from the reference symbol. The framing scheme provides and defines an ACK/NACK message that is associated with at least one ACK/NACK context frame. Each ACK/NACK message has an ACK/NACK message start position that may be offset with respect to the reference symbol of its respective physical frame by a rational (typically integer) number of symbols, such to define an ACK/NACK message offset. The ACK/NACK message is operative to provide acknowledgement/disacknowledgement of reception of at least part of the bit stream contained at least partly in the physical frame. The ACK/NACK message may be further operative to provide acknowledgement/disacknowledgement of reception of the bit stream contained at least partly in a previous physical frame among the plurality of discrete physical frames.

According another aspect of the disclosed technique, there is thus provided a method for framing a bit stream that is divided among a plurality of discrete physical frames. Each physical frame is of a definite number of symbols in duration. Each symbol is associated with at least one sub-carrier in a plurality of sub-carriers. The physical frame is partitioned in time into at least an uplink zone and a downlink zone, the method comprising the procedure of allocating a logical frame in the bit stream. The logical frame has a logical frame start position that is offset by a rational number of symbols from a reference symbol. The reference symbol is selected from the definite number of symbols. The logical frame extends in time to coincide with at least part of the duration of the physical frame and at least part of the duration of another physical frame in the plurality of discrete physical frames.

According a further aspect of the disclosed technique, there is thus provided a method for framing a bit stream that is divided among a plurality of discrete physical frames. Each physical frame is of a definite number of symbols in duration. Each symbol is associated with at least one sub-carrier in a plurality of sub-carriers. The physical frame is partitioned in time into at least an uplink zone and a downlink zone, the method comprising the procedures of allocating a media access protocol (MAP) context frame in the bit stream and providing a MAP message which precedes the MAP context frame. The MAP context frame has a MAP context frame start position that is offset by an integer number of symbols from a reference symbol within the physical frame.

According another aspect of the disclosed technique, there is thus provided a method for framing a bit stream that is divided among a plurality of discrete physical frame. Each physical frame is of a definite number of symbols in duration. Each symbol is associated with at least one sub-carrier in a plurality of sub-carriers. The physical frame is partitioned in time into at least an uplink zone and a downlink zone. The method comprising the procedures of allocating an ACK/NACK context frame within a control channel, and providing an ACK/NACK message for acknowledgement/disacknowledgement of reception of at least part of the bit stream contained at least partly in the physical frame. The ACK/NACK context frame has an ACK/NACK start position that is offset by an integer number of symbols from a reference symbol within the physical frame. The ACK/NACK message is associated with at least one respective ACK/NACK context frame. The ACK/NACK message has an ACK/NACK message start position that is offset by a rational number of symbols from the reference symbol.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a framing scheme that employs logical frames, which are offset with respect to the beginning of a physical frame, thereby relaxing constraints imposed by timing requirements of the acknowledgement/negative-acknowledgement (ACK/NACK) transmissions while only moderately increasing the size of retransmission buffers, thereby reducing system overhead and latency. In accordance with the framing scheme, the disclosed technique further provides a method for forward error correction (FEC) block mapping to time division duplexing (TDD) frames, characterized by having non-integer number of FEC codewords in a frame.

Essentially, the disclosed technique involves a scheme and a method for framing a bit stream. It is assumed that this bit stream is divided among a plurality of discrete and sequenced physical frames and that each physical frame is of a definite number of symbols in duration. Each symbol is associated with at least one sub-carrier in a plurality of sub-carriers. The physical frame is partitioned in time into at least an uplink zone and a downlink zone. According to one aspect of the disclosed technique, logical frames are defined. Particularly, the framing scheme allocates a logical frame in the bit stream, the former having a logical frame start position that is offset by a rational number of symbols from a reference symbol. The reference symbol is one which is selected from the definite number of symbols. The logical frame extends in time to coincide with at least part of the duration of the physical frame and at least part of the duration of another (i.e., either a subsequent physical frame in case the logical frame is positively offset in time or a previous physical frame in case the logical frame is negatively offset in time).

According to another aspect to the disclosed technique, a media access protocol (MAP) context frame, is defined and allocated in the bit stream. The MAP context frame has a MAP context frame start position that is offset by a rational number (i.e., typically integer) of symbols from the reference symbol within the physical frame. The framing scheme and method provides and defines a MAP message which precedes the MAP context frame. The MAP message includes at least one reference data type (e.g., a pointer) that respectively defines (i.e., references, points, etc.) a logical frame sub-carrier offset in relation to the sub-carrier associated with the reference symbol, as well as the logical frame start position.

According to a further aspect of the disclosed technique, an ACK/NACK context frame is defined and allocated in the bit stream. The ACK/NACK context frame has an ACK/NACK context frame start position that is offset by a rational number (i.e., typically integer) of symbols from the reference symbol. Furthermore, the framing scheme provides and defines an ACK/NACK message that is associated with at least one ACK/NACK context frame. The ACK/NACK message is operative to provide acknowledgement/disacknowledgement of reception of at least part of the bit stream contained at least partly in the physical frame. The ACK/NACK message is further operative to provide acknowledgement/disacknowledgement of reception at least partly in a previous physical frame among the plurality of discrete physical frames. The disclosed technique will now be elucidated in greater detail in the following description in conjunction with, and in cross-reference to the accompanying Figures.

The terms 'upstream' and 'uplink' are interchangeable throughout the description, drawings, and claims. Likewise, the terms 'downstream' and 'downlink' are interchangeable throughout the description, drawings, and claims. The term 'latency' refers to an end-to-end time delay between data transmission and/or reception (e.g., between a transmitter and a receiver). The terms 'FEC block' and 'FEC codeword' are interchangeable and refer to a codeword that includes an n-bit unit containing data (i.e., a data payload) and check bits (i.e., used for error correction or some combination of the former and latter in the case of non-systematic codes). The use of a slash mark '/' (also termed "forward slash") throughout the detailed description, the drawings, and the claims, indicates a mutually exclusive selection between two choices on opposite sides (i.e., right and left) of the slash mark. For example, 'A/B' would indicate a choice of either A (and not B) or B (and not A). The data framing scheme and method of the disclosed technique as described herewith may be implemented in a communication network (e.g., a computer network) utilizing data terminal equipment (DTE) devices that communicate with each other.

The disclosed technique provides a method for FEC block mapping to TDD frames. In traditional communication techniques, such as the digital subscriber line (DSL), FEC blocks are sequentially interleaved (inserted) on a bit stream, such that there is no necessity to insert any stuffing bits (i.e., non-information bits) to synchronize the sequentially inserted FEC blocks to any reference point (e.g., symbol, time) beside the insertion point. Although this technique is considered efficient as in effect, no BW is allocated for the purposes of synchronization, this technique per se does not provide a way for handling synchronization-loss events. A synchronization-loss event occurs when inserted bits of data are lost or blundered in a way that results in these erred bits being propagated along the continuation of the data block. The typical approach for resynchronization in numerous communication systems that employ TDD is to use the TDD frame itself as the synchronization point. This approach though, in itself requires transmission and reception of an integer number of FEC blocks within each frame, which may result in considerable overhead due to unused BW needed for padding (i.e., the insertion of non-information bits for data structure alignment). Also, constraining the use of an integer number of FEC blocks within a frame may reduce coding gain, as suboptimal FEC parameters might be used.

To solve this problem, the disclosed technique employs a non-integer number of FEC blocks within a frame. The use of a non-integer number of FEC codewords in a frame, in effect decouples the constraints between the frame structure and the size of individual data transmission units (DTUs). As an example, let us evaluate numerically, the overhead in case the number of FEC blocks in a frame is forced to be an integer number. Suppose that a FEC block carries 540 bytes of payload (data) or 4320 bits. The baseline application of G.fast, for example, requires aggregated throughput of ~100 Mbps. By assuming a symbol time duration of 22 μsec. there is a need to transmit approximately 2200 payload bits per symbol. For lower transmission rates, we deduce that FEC blocks span over ~2 symbols. If it is to be assumed that an integer number of FEC blocks are to be accommodated in a TDD frame, two symbols (per UL/DL direction) may be lost (i.e., 4 symbols in total). Consequently, for a TDD frame period of ~1 msec. (having ~44 symbols), there is a framing overhead penalization for using an integer number of FEC blocks of approximately 9% (4.5% on average).

Figure 2:
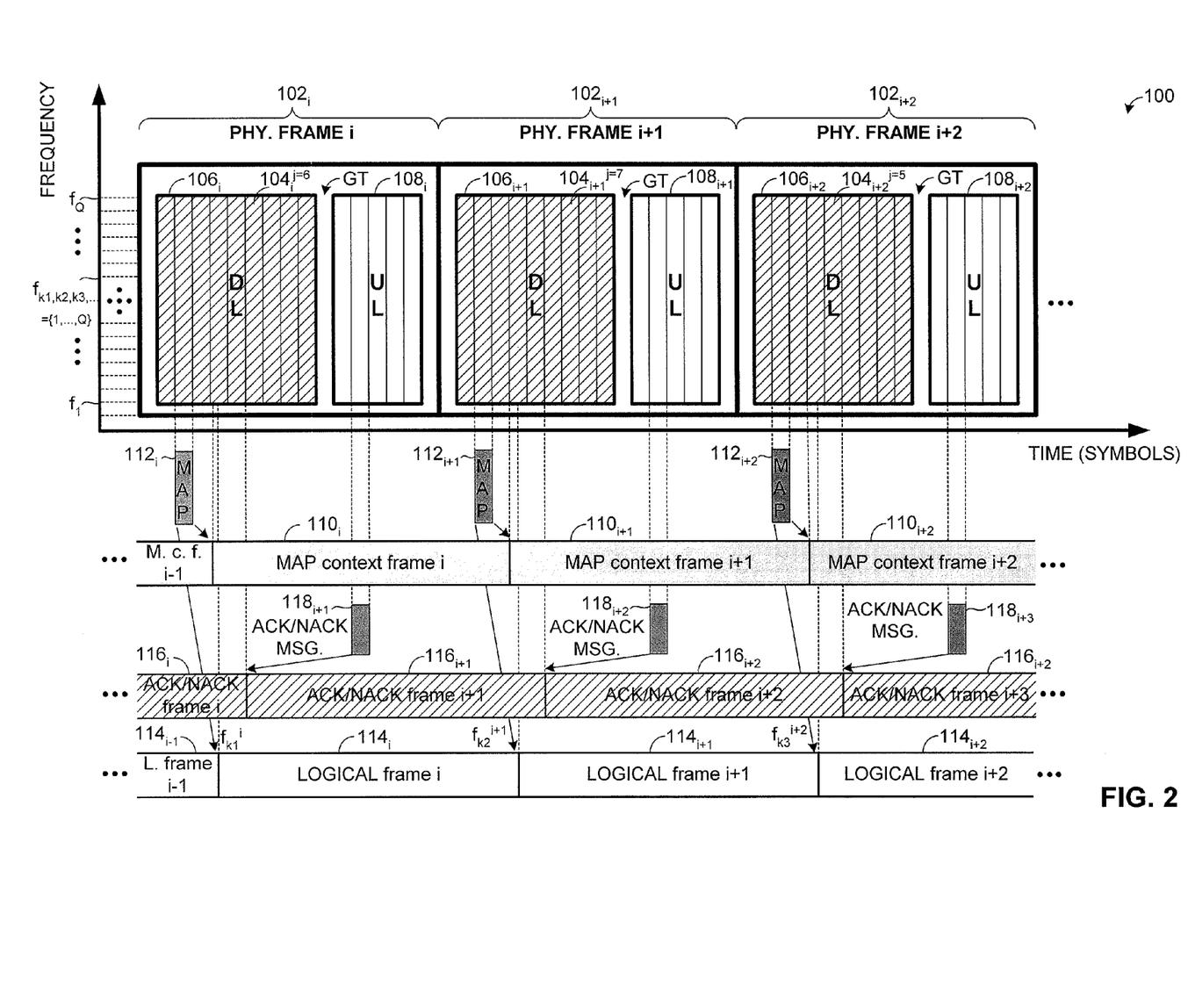
FIG. 2 is a schematic illustration of a data communication framing scheme, constructed and operative in accordance with an embodiment of the disclosed technique.

The disclosed technique hereby provides a flexible framing scheme having a non-integer number of FEC blocks in a TDD frame, to surmount the problem of overhead that is associated with the utilization of an integer number of FEC blocks in a TDD frame, as demonstrated above. Reference is now made to FIG. 2, which is a schematic illustration of a data communication framing scheme, generally referenced 100, constructed and operative in accordance with an embodiment of the disclosed technique. The framing scheme relates to a plurality of frame types that are employed for transmitting and receiving digital information that is encoded in a bit stream (not shown).

The bit stream includes a plurality of M symbols represented by the index notation $102^j$ (where j and M are integers, and the superscript j represents the j-th symbol between 1 and M>0). This bit stream is fragmented into a sequence of discrete frames, which are represented by a plurality of physical frames $104_i$, $104_{i+1}$, $104_{i+2}$, ..., $104_N$ (where i and N are integers and i represents the i-th frame between 1 and N>0). Each frame includes a preset amount of symbols (e.g., 12). A double indexing representation may be employed (i.e., superscript and subscript) whereby a symbol of a particular frame is denoted by $102_i^j$ (i.e., the j-th symbol of the i-th frame). Each physical frame is further partitioned into a downlink (DL) zone and an uplink (UL) zone, having a guard time (GT) interval therebetween. In particular, physical frame $102_i$ is partitioned into downlink zone $106_i$ and uplink zone $108_i$ that are separated by a guard time interval (generically referenced as in FIG. 1 by "GT"). Physical frame $102_{i+1}$ is partitioned into downlink zone $106_{i+1}$ and uplink zone $10_{i+1}$, and physical frame $102_{i+2}$ is partitioned into downlink zone $106_{i+2}$ and uplink zone $108_{i+2}$. The physical frame duration period is defined by the number of symbols within the particular frame (e.g., a physical frame duration period of 12 symbols).

Essentially, the total BW available for transmitting the bit stream is typically limited by hardware constraints, and as such it is usually partitioned into a plurality sub-channels, where each sub-channel includes its respective frequency range. Each sub-channel is assigned its respective carrier frequency ("tone"). The carrier frequency lies in between the frequency range of its respective sub-channel. The disclosed technique employs orthogonal frequency-division multiplexing (OFDM) for encoding the digital bit stream on multiple carrier frequencies $f_{k1, k2, k3 \ldots} = \{1, \ldots, Q\}$, as illustrated in FIG. 2 by the vertical axis. The horizontal axis in FIG. 2 represents time (in symbol units). There are Q sub-carriers which are chosen to be orthogonal to each other. Each sub-index k1, k2, k3, etc., (between 1 and Q) denotes the starting sub-carrier frequency attributed for the transmission of DTUs. Each DTU contains an integer number of FEC codewords. Each symbol is associated with or defined by at least one sub-carrier of an integer number of Q sub-carriers. A symbol may be described as a signal element that is defined, at least partly, by at least one (typically a plurality) of sub-carriers. Symbols persist for a preset period of time.

Characterization of the framing scheme involves a plurality of media access protocol (MAP) context frames $110_i$, $110_{i+1}$, ..., $110_N$, a plurality of MAP messages $112_i$, $112_{i+1}$, ..., $112_N$, a plurality of logical frames $114_i$, $114_{i+1}$, ..., $114_N$, a plurality of ACK/NACK context frames $116_i$, $116_{i+1}$, ..., $116_N$, and a plurality of ACK/NACK messages $114_i$, $118_{i+1}$, ..., $118_N$.

Each MAP context frame $110_i$, $110_{i+1}$, ..., $110_N$ is associated with its respective physical frame (indicated such that both possess the same index). For example, MAP context frame $110_i$ is associated with physical frame $102_i$. Each MAP context frame further has a MAP context frame start position and MAP context frame end position that define therebetween a respective MAP context frame duration period (i.e., equivalent to its respective physical frame duration period). The MAP context frame is located at a rational (i.e., typically integer) number of symbols from a reference symbol (e.g., a first symbol) with respect to the beginning of its respective physical frame. An example of a reference symbol in physical frame $102_i$ is symbol $106_i^6$ (i.e., j=6). Typically, the reference symbol of a particular physical frame is the first symbol (i.e., $106_i^1$). Hence the MAP context frame is offset (i.e., shifted) with respect to its associated physical frame (in case this integer is not zero). FIG. 2 illustrates that MAP context frame $110_i$ is positively shifted three symbols from the beginning of physical frame $102_i$. MAP context frames define the hardware parameters used by the communication system and relate to individual symbols or groups of symbols. Example hardware parameters include parameters that define the digital modulation scheme (used for transmission and reception) that is employed (e.g., quadrature amplitude modulation (QAM), phase-shift keying (PSK)), as represented in a constellation diagram (not shown).

Logical frames contain an integer number of data transmission units (DTUs) (not specifically shown). Each DTU includes an integer number of FEC blocks (not specifically shown). Each logical frame $114_i$, $114_{i+1}$, ..., $114_N$ has a logical frame start position and a logical frame end position that define therebetween a logical frame duration period. Each logical frame is associated with a respective physical frame (indicated such that both possess the same index). Logical frames span a rational (typically non-integer) number of symbols in duration. The logical frame duration period is equal, on average, to its respective physical frame duration period. The logical frame start position may be offset with respect to the first symbol of its respective physical frame by a rational number of symbols such to define a logical frame offset. FIG. 2 illustrates that logical frame $114_{i+1}$ positively shifted (i.e., its start position) by 3.5 symbols with respect to its respective physical frame $102_{i+1}$ (i.e., its start position thus being located within symbol $106_{i+1}{}^4$). Sub-indices k1, k2, k3 denote the respective starting sub-carrier frequency attributed for the transmission of the DTUs, in logical frames $114_i$, $114_{i+1}$, and $114_{i+2}$. Specifically, the double-indexing notation $f_{k1}{}^i$ is used in FIG. 2 to indicate that the starting sub-carrier frequency k1 is attributed to the i-th logical frame ($114_i$).

Each MAP message $112_i$, $112_{i+1}$, ..., $112_N$ is associated with a respective MAP context frame (indicated such that both possess the same index). As shown in FIG. 2, MAP messages precede their respective (i.e., index-wise) MAP context frame. Particularly, in the example given in FIG. 2, MAP message $112_i$ precedes its respective MAP context frame $110_i$ by two symbols. MAP message $112_{i+1}$ precedes its respective MAP context frame $110_{i+1}$ by two symbols, and so forth. Each MAP message may include a reference data type (e.g., a pointer) that defines a MAP context frame start position (i.e., the offset, in symbols, with respect to a reference symbol of its respective physical frame), the logical frame offset (in symbol units), as well as the duration of the UL and DL zones. With reference to FIG. 2, each MAP message includes a pointer that points to and determines the particular starting sub-channel carrier $f_{k1, k2, k3 ... = \{1 ..., Q\}}$ assigned to its respective logical frame for transmission of DTUs. Typically, each MAP message (e.g., $112_{i+1}$) is offset from its respective MAP context frame (e.g., $110_{i+1}$) by a predetermined (known) number of symbols (e.g., 2). Alternatively, each MAP message includes a pointer (indicated by short arrows) that points to and determines its respective MAP context frame start position, as well as its respective logical frame start position (indicated by long arrows). To graphically demonstrate in greater detail the MAP frame concept, reference is further made to FIG. 3, which is a schematic illustration that shows the relationship between MAP messages and their respective MAP context frames and logical frames as a function of frequency and time. Effectively, the logical frames provide a way of synchronizing DTUs at the receiver end, receiving the bit stream. The logical frames provide a way of synchronizing the receiver to the DTUs that contain the bit stream also when the transmission parameters change. The MAP context frame defines when transmission parameters take effect. For example, the MAP context frame defines a new modulation scheme that takes effect from a particular symbol. For example, from a particular symbol the modulation scheme changes from quadrature phase-shift keying (QPSK) to 16-QAM.

Alternatively, DTU's follow one another without the reference data type (e.g., pointer) indication per MAP message. In this case, synchronization may be reestablished once every number of TDD frames, super-frames or at other predefined times. According to this approach, synchronization may be maintained as long as the transmission parameters are not substantially changed. Once transmission parameters may change to adapt to varying transmission conditions and if a reconfiguration message is lost, synchronization is also lost.

Figure 3:
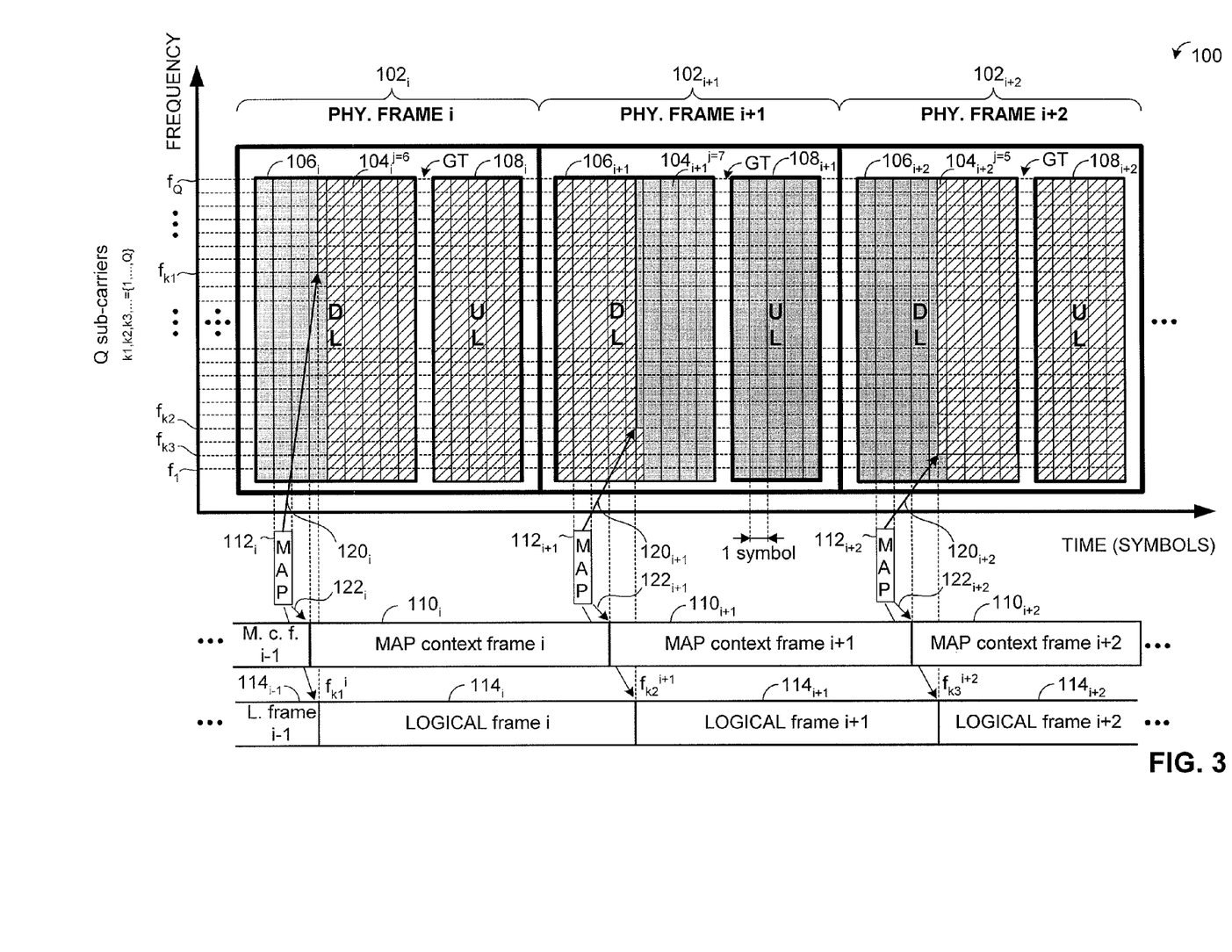
FIG. 3, which is a schematic illustration that shows the relationship between MAP messages and their respective MAP context frames as a function of frequency and time.

FIG. 3 illustrates how each MAP message points via its respective pointer to a start position of its respective logical frame within its respective physical frame as a function of time (symbol) and sub-carrier (i.e., out of 1 through Q sub-carriers). The start position of a particular frame entity in time (symbols) with respect to the reference symbol of a respective physical frame is referred herein as the offset in symbol units or simply "symbol offset". The start position of a particular sub-carrier with respect to the sub-carrier of a respective physical frame is referred herein as the "logical" offset in sub-carriers or simply "sub-carrier offset" (i.e., prior to application of any frequency interleaving function of pilot insertion). As aforementioned, each symbol is associated with at least one sub-carrier. The bit stream is encoded on multiple carrier frequencies (i.e., according to the principles OFDM), which are employed to carry and convey data. The logical frame sub-carrier offset defines a starting sub-carrier k (between 1 and Q sub-carriers), to which data is to be encoded upon spanning multiple sub-carriers from k to Q. A logical frame symbol offset defines the starting time in symbol units that the logical frame containing DTUs begin (with respect to the reference symbol). For example, MAP message $112_i$ designates via pointer $120_i$ a symbol offset of 3.5 symbols (i.e., within symbol $106_i{}^4$) and a sub-carrier offset of $f_{k1}{}^i$ for logical frame $114_i$. The end position of a particular logical frame (e.g., logical frame $114_i$) both in terms of symbols and in sub-carriers is defined as the start position of its succeeding logical frame (i.e., logical frame $114_{i+1}$). Thus, logical frame $114_{i+1}$ starts where logical frame $114_i$ ends. In particular, MAP message $112_{i+1}$ designates via pointer $120_{i+1}$ a symbol offset of 4.5 symbols (i.e., within symbol $104_{1+1}{}^5$) and a sub-carrier offset of $f_{k2}{}^{i+1}$ for logical frame $114_{i+1}$. Thus DTUs contained within the time extent of logical frame $114_{i+1}$, are transmitted by Q–$f_{k2}$ subcarriers. Hence, in this example, symbol $106_{i+1}{}^5$ is associated with Q–$f_{k2}$ sub-carriers. MAP message $112_{i+2}$ designates via pointer $120_{i+2}$ a symbol offset of 4.5 symbols (i.e., within symbol $104_{i+2}{}^5$) and a sub-carrier offset of $f_{k3}{}^{i+2}$ for logical frame $114_{i+2}$.

In a similar manner, MAP messages $112_i$, $112_{i+1}$, and $112_{i+2}$ may designate, respectively via pointers $122_i$, $122_{i+1}$ and $122_{i+2}$, offsets and sub-carrier offsets of their respective MAP context frames $110_i$, $110_m$ and $110_{i+2}$. Typically, the symbol offset of the MAP context frames are integer and constant, whereas the symbol offset of the logical frames are dynamic (i.e., not necessarily constant) and may be non-integer. The duration (i.e., lengths in symbol units) of MAP context frames span substantially over one physical frame in duration. According to this technique, padding overheads are reduced to one tone per direction and the framing overhead is reduced to approximately 0.002%. This technique allows resynchronization to occur at frame boundaries and further facilitates modification of FEC parameters (per frame) without substantial synchronization complications.

With reference back to FIG. 2, each ACK/NACK context frame $116_i$, $161_{i+1}$, ..., $116_N$ is associated with a respective physical frame (indicated such that both possess the same index). Each ACK/NACK context frame has an ACK/NACK start position and an ACK/NACK end position that define therebetween an ACK/NACK duration period. The ACK/NACK frame may be offset with respect to the reference symbol of its respective physical frame by a rational (typically integer) number of symbols, such to define an ACK/NACK offset. For example, FIG. 2 illustrates that ACK/NACK frame $116_{i+1}$ is negatively shifted 9 symbols with respect to the first symbol in its respective physical frame $102_{i+1}$, thereby setting the ACK/NACK offset equal to –9.

Each logical frame $114_i$, $114_{i+1}$, ..., $114_N$ has a logical frame start position and a logical frame end position that define therebetween a logical frame duration period. Each logical frame is associated with a respective physical frame (indicated such that both possess the same index). The duration of each logical frame is substantially equal, on average, to its respective physical frame duration period. In other words the start and end positions of the logical frames may change slightly (i.e., from frame to frame) so as to allow for an integer number of FEC blocks to be accommodated by them (i.e., the logical frames). The logical frame start position may be offset with respect to the first symbol of its respective physical frame by a rational number of symbols such to define a logical frame offset (i.e., typically a non-integer number). FIG. 2 illustrates that logical frame $114_{i+1}$ is negatively shifted (i.e., its start position) by 2.5 symbols with respect to its respective physical frame $102_{i+1}$ or positively shifted by 12.5 symbols with respect to the start of physical frame 102, (i.e., its start position thus being located within symbol $108_{i+3}$). Alternatively, the logical frame offset is an integer number (of symbols in relation to the reference symbol—not shown).

Figure 4:
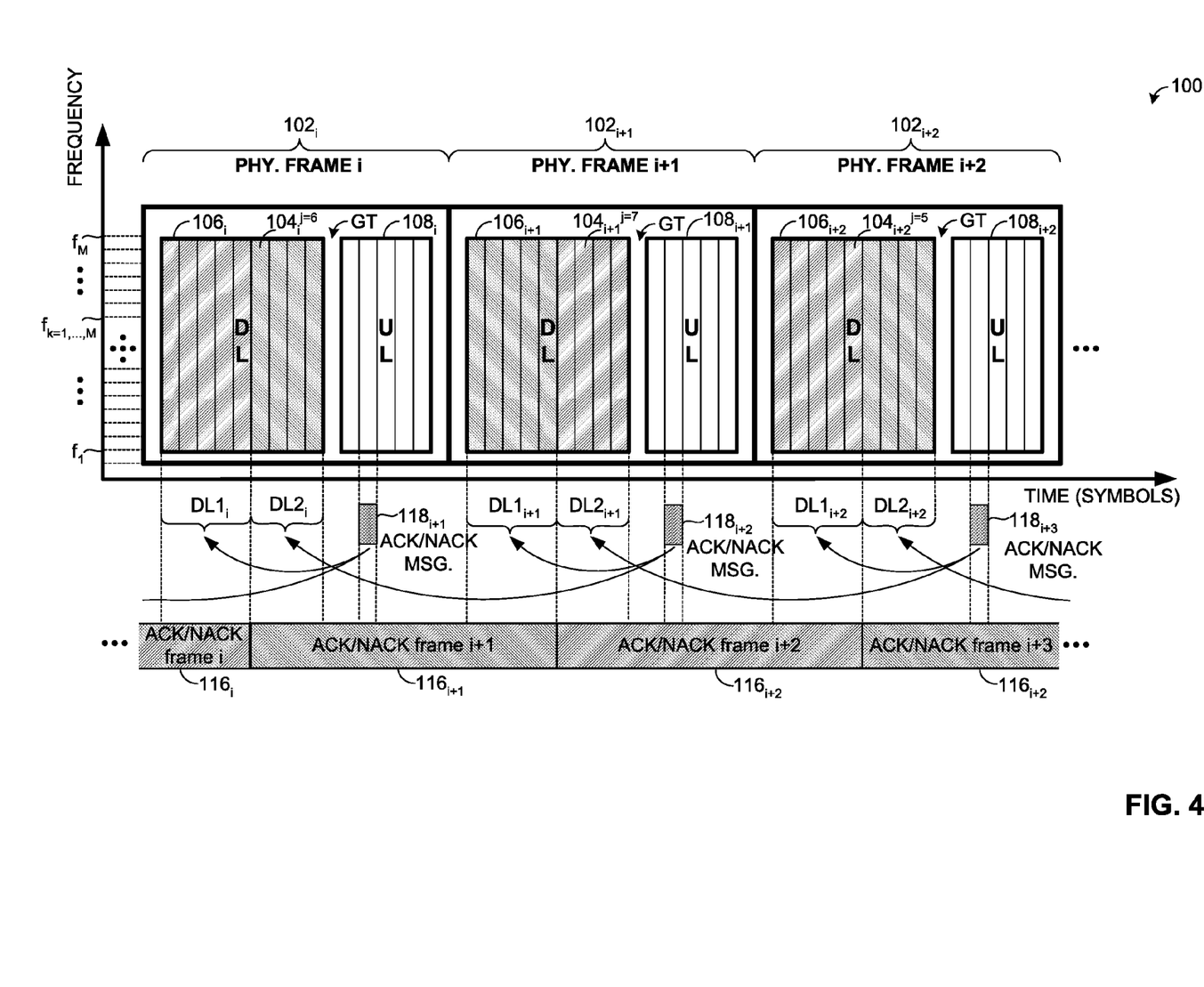
FIG. 4 is a schematic illustration of a detailed view of the ACK/NACK framing scheme of FIG. 2.

With respect to ACK/NACK context frames, reference is now further made to FIG. 4 is a schematic illustration of a detailed view of the ACK/NACK framing scheme of FIG. 2. FIG. 4 illustrates a plurality of ACK/NACK messages $118_i$, $118_{i+1}, \ldots, 118_N$, each of which is associated with its respective ACK/NACK context frame $116_i$, $116_{i+1}, \ldots, 116_N$ (of the same index). FIG. 4 further illustrates that ACK/NACK context frames $116_{i+1}$, $116_{i+2}$, and $116_{i+3}$ are offset (i.e., their start positions) by five symbols in relation to each of their respective physical frames $102_i$, $102_{i+1}$, and $102_{i+2}$, respectively. The ACK/NACK message, which is (time-wise) located within an UL zone of a particular physical frame, is operative to provide acknowledgement/disacknowledgement of (correct) reception of the of the at least part of the bit stream contained (i.e., conveyed) at least in part in the DL zone of physical frame that time-wise coincide with the duration of its respective ACK/NACK context frame and at least part of the bit stream contained in a previous ACK/NACK context frame (indicated by the arrows). Each ACK/NACK message has an ACK/NACK message start position and an ACK/NACK message end position that define therebetween an ACK/NACK message duration period. The ACK/NACK message may be offset with respect to a reference symbol of its respective physical frame by a rational (typically integer) number of symbols, such to define an ACK/NACK message offset. The ACK/NACK message may be transmitted over the same symbol that includes the MAP message. Alternatively, the ACK/NACK message may be transmitted over a different symbol (i.e., in time). The start location in symbols of the ACK/NACK message may be selected such that the end-to-end delay between transmission and reception (including retransmissions) is substantially minimized.

Specifically, ACK/NACK message $118_{i+3}$ (its start position is located at symbol $108_i{}^2$ within UL zone $108_{i+2}$ of physical frame $102_{i+2}$), which is associated with ACK/NACK context frame $116_{i+3}$, is operative to provide acknowledgement/disacknowledgement of reception of the at least part of the bit stream contained within at least part in downlink zone $106_{i+2}$ (denoted by "DL1$_{i+2}$") and at least part of the bit stream contained in downlink zone $106_{i+1}$ (denoted by "DL2$_{i+1}$"), as indicated by the arrows in FIG. 4. Similarly, ACK/NACK message $118_{i+2}$ (located within UL zone $108_{i+1}$ of physical frame $102_{i+1}$), which is associated with ACK/NACK context frame $116_{i+2}$, is operative to provide acknowledgement/disacknowledgement of reception of the bit stream contained within at least part in downlink zone $106_{i+1}$ (denoted by "DL1$_{i+1}$") and at least part of the bit stream contained in downlink zone $106i$ (denoted by "DL2i"), as indicated by the arrows in FIG. 4.

Hence the ACK/NACK message is operative to provide acknowledgement/disacknowledgement of reception of at least part of the bit stream contained at least in part in the DL zone of that particular physical frame and the at least part of the bit stream contained at least in part in the DL zone of a previous physical frame.

In an alternative case, which is not shown, the ACK/NACK message is located within a DL zone of a particular physical frame, and is operative to provide acknowledgement/disacknowledgement of at least part of the bit stream contained in the UL zone of the physical frames that time-wise coincide with the duration of the previous ACK/NACK context frame.

In an alternative special case, which is not shown, the ACK/NACK context frame start position coincides with its respective physical frame start position such that the ACK/NACK context frame coincides with only one physical frame in time. In this case, the ACK/NACK message is operative to provide acknowledgement/disacknowledgement of reception of at least part (typically all) of the bit stream contained in its respective physical frame and not in previous physical frames. In this case, it is noted that ACK/NACK context frame start position is offset by zero symbols.

Figure 5:
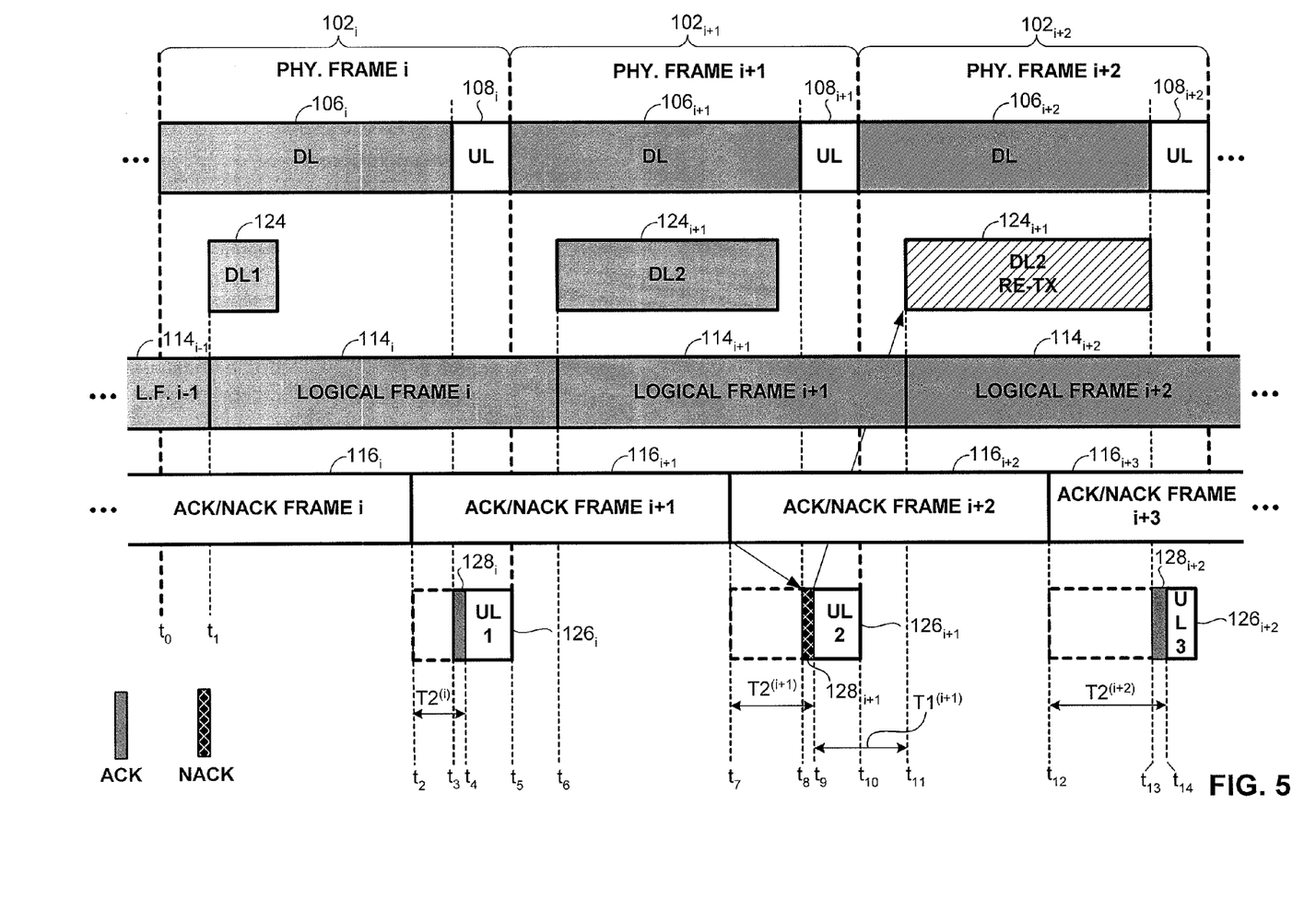
FIG. 5 is a schematic illustration of a downlink retransmission timing diagram having a short upstream.

Avoiding the need for excessively high buffer requirements, can be solved by limiting the uplink zone duration. Alternatively, this may also be achieved by offsetting the ACK/NACK frame (i.e., involved in the retransmission mechanism) from the physical frame. By providing ACK/NACK context frames that are offset with respect to the physical frames, the time required for the generation of ACK/NACK messages may be lengthened. To further demonstrate this, reference is now made to FIG. 5, which is a schematic illustration of a downlink retransmission timing diagram having a short upstream. FIG. 5 illustrates physical frames $102_i$, $102_{i+1}$ and $102_{i+2}$ extending along the horizontal axis as a function of time. Without loss of generality it is assumed that UL zones $108_i$, $108_{i+1}$ and $108_{i+2}$ are very short time-wise in comparison to the DL zones $106_i$, $106_{i+1}$ and $106_{i+2}$. FIG. 5 further illustrates ACK/NACK context frames $116_i$, $116_{i+1}$, $116_{i+2}$ that are offset with respect to physical frames $102_i$, $102_{i+1}$ and $102_{i+3}$ and logical frames $114_{i+1}$, $114_{i+2}$, and $114_{i+3}$ that are respectively offset with respect to physical frames $102_{i+1}$, $102_{i+2}$, and $102_{i+3}$.

Suppose a transmitter (not shown) transmits a transmission $124_i$ ("DL1") to a receiver (not shown) starting at time $t_1$ (i.e., at the start position time of logical frame $114_i$) within the allocated downlink zone $106_i$. Since UL zone $108_i$ is short in length and it is assumed that there is a small amount of data to be sent, UL transmission $126_i$ may start transmission at an earlier time of $t_2$. Since ACK/NACK context frame $116_{i+1}$ is offset with respect to physical frame $102_{i+1}$, the time required for the generation of an ACK message (i.e., in this case $128_i$) spans a time denoted in FIG. 5 as $T2^{(1)}$, which is greater than that time if ACK/NACK context frame $116_{i+1}$ were aligned with physical frame $102_{i+1}$. Consequently, ACK message $128_i$ may be transmitted at the start of UL zone $108_i$ at time $t_3$.

In a similar manner, suppose the transmitter transmits transmission $124_{i+1}$ ("DL2") starting at time $t_6$ (i.e., at the start position time of logical frame $114_i$) during DL zone $106_{i+1}$. Let us assume in this case that transmission $124_{i+1}$ is erred or not properly received. Since ACK/NACK context frame $116_{i+2}$ is offset by a time equivalent to $t_{10}$-$t_7$ from physical frame $102_{i+2}$ this provides sufficient time required for the generation of NACK message $128_{i+1}$, denoted by $T2^{(i+1)}$, from time $t_7$, consequently enabling retransmission of transmission $124_{i+1}$ in the subsequent frame. Particularly, the transmitter retransmits transmission $124_{i+2}$ ("DL2-RE-TX") in DL zone $106_{i+2}$ of physical frame $102_{i+2}$ at starting time $t_{11}$ (i.e., at the start position time of logical frame $114_{i+1}$), which is $T1^{(i+1)}$ from time $t_9$ (ending time of NACK message $128_{i+1}$) where $T1^{(i+1)} = t_{11} - t_9$ denotes the time interval required for the transmitter to respond to the retransmission request. Thus, by providing sufficient time for the generation of NACK message $128_{i+1}$ ($T2^{(i+1)}$), the retransmission of transmission $124_{i+1}$ (i.e., $124_{i+2}$) is possible in the subsequent frame. Thus the retransmission is not delayed by more than one frame (i.e., as demonstrated in FIG. 1, which is prior art).

In a similar manner, the time required for the generation of ACK message $128_{i+2}$ in response to retransmission $124_{i+2}$, denoted by $T2^{(i+2)}$ may start at time $t_{11}$ (i.e., at the start position time of logical frame $114_{i+2}$). Substantially at time $t_{13}$ when retransmission $124_{i+2}$ ends it is possible to generate ACK message $128_{i+2}$ at the start of UL zone $108_{i+2}$ thereby indicating to the transmitter that retransmission $124_{i+2}$ was correctly received.

It was thus shown that given a limited allocated time interval for the UL zone (i.e., in comparison to the DL zone, as it typically in asymmetric communication (e.g., in asymmetric digital subscriber line (ADSL)) there are no retransmission delays to multiple succeeding frames. Implementation of high retransmission buffering requirements may thus be avoided so as to contribute in the reduction of system overhead and latency.

Figure 6:
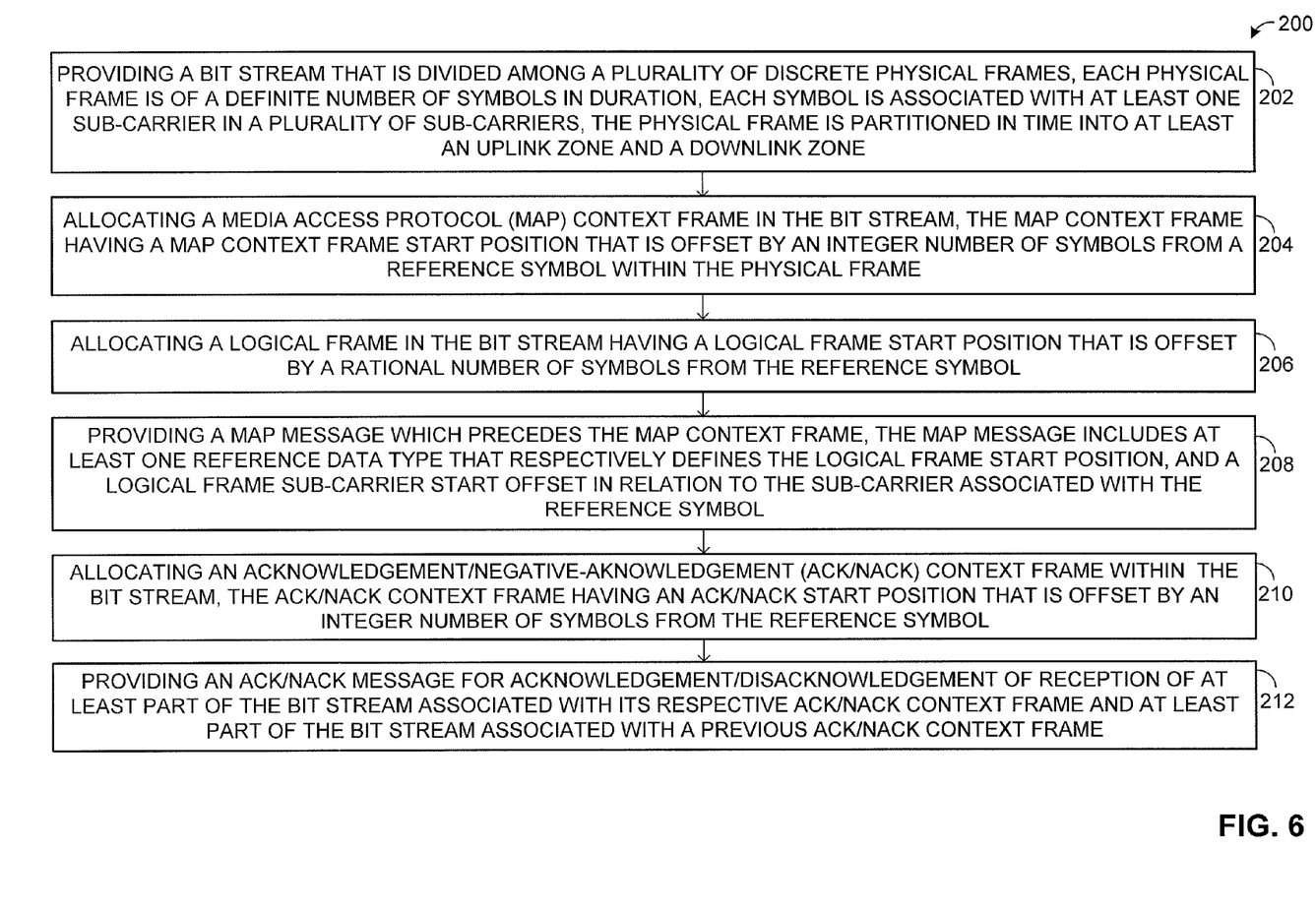
FIG. 6 is a schematic block diagram of a method for framing digital information contained within a bit stream, constructed and operative in accordance with the data communication framing scheme.

According to another aspect of the disclosed technique, there is thus provided a method for framing digital information contained within a bit stream. Reference is now made to FIG. 6, which is a schematic block diagram of a method, generally referenced 200, for framing digital information contained within a bit stream, constructed and operative in accordance with the data communication framing scheme.

In procedure 202 a bit stream that is divided among a plurality of discrete physical frames is provided. Each physical frame has a definite number of symbols in duration. Each symbol is associated with at least one sub-carrier in a plurality of subcarriers. The physical frame is partitioned in time into at least an uplink zone and a downlink zone. With reference to FIGS. 2 and 3, a bit stream is divided into a plurality of discrete physical frames $102_i$, $102_{i+1}$, and $102_{i+2}$. Physical frames $102_i$, $102_{i+1}$, and $102_{i+2}$ each have a definite number of symbols in duration, respectively represented by the j superscript and the horizontal time (symbol) axis. The number of j symbols per i-th frame defines the duration of the i-th physical frame. Physical frames $102_i$, $102_{i+1}$, and $102_{i+2}$ are each respectively partitioned into at least respective uplinks zones $108_i$, $108_{i+1}$, and $108_{i+2}$ and respective downlink zones $106_i$, $106_{i+1}$, and $106_{i+2}$. Each symbol is associated with at least one sub-carrier k1, k2, k3, etc., in a plurality of sub-carriers numbered 1 through Q (where Q is a positive integer). The bit stream is transmitted by at least one sub-carrier 1 through Q.

In procedure 204 a MAP context frame is allocated in the bit stream. The MAP context frame has a MAP context frame start position that is offset by an integer number of symbols from a reference symbol within the physical frame. With reference to FIGS. 2 and 3, MAP context frames $110_i$, $110_{i+1}$, $110_{i+2}$ are allocated in the bit stream. Each MAP context frame $110_i$, $110_{i+1}$, $110_{i+2}$ has a MAP context frame start position that is offset by an integer number (i.e., 3) of symbols from reference symbol (e.g., $106_i^1$).

In procedure 206, a logical frame in the bit stream is allocated. The logical frame has a logical frame start position that is offset by a rational number of symbols from the reference symbol. With reference to FIGS. 2 and 3, logical frames $114_i$, $114_{i+1}$, $114_{i+2}$ are allocated in the bit stream. Each of logical frames $110_i$, $110_{i+1}$, $110_{i+2}$ have respective start positions that are offset by a rational number (i.e., 3.5, 4.5 and 4.5, respectively) from reference symbols $106_i^1$, $106_{i+1}^1$, and $106_{i+2}^1$, respectively.

In procedure 208, a MAP message, which precedes the MAP context frame, is provided. The MAP message includes at least one reference data type that respectively defines the logical frame start position, and a logical frame sub-carrier start offset in relation to the sub-carrier associated with the reference symbol. With reference to FIGS. 2 and 3, MAP messages $112_i$, $112_{i+1}$, $112_{i+2}$ respectively precede MAP context frames $110_i$, $110_{i+1}$, $110_{i+2}$. MAP messages $110_i$, $110_{i+1}$, $110_{i+2}$ respectively include pointers $122_i$, $122_{i+1}$, $122_{i+2}$ that respectively define the respective start positions of logical frames $114_i$, $114_{i+1}$, $114_{i+2}$. MAP messages $110_i$, $110_{i+1}$, $110_{i+2}$ respectively define the logical frame sub-carrier start offsets ($f_{k1}$, $f_{k2}$, and $f_{k3}$, respectively) in relation to the subcarrier ($f_i$) associated with respective reference symbols $106_i^1$, $106_{i+1}^1$, and $106_{i+2}^1$. Furthermore, MAP messages $110_i$, $110_{i+1}$, $110_{i+2}$ respectively include pointers $120_i$, $120_{i+1}$, $120_{i+2}$ that respectively define MAP context frames $110_i$, $110_{i+1}$, $110_{i+2}$ start positions.

In procedure 210, an ACK/NACK context frame is allocated within the bit stream. The ACK/NACK context frame has an ACK/NACK start position that is offset by an integer number of symbols from the reference symbol. With reference to FIGS. 2 and 4, ACK/NACK context frames $116_i$, $116_{i+1}$, and $116_{i+2}$ have start positions that are offset by an integer number of symbols (i.e., 5) from respective reference symbols $106_i^1$, $106_{i+1}^1$, and $106_{i+2}^1$.

In procedure 212, an ACK/NACK message is provided for acknowledgement/disacknowledgment of reception of at least part of the bit stream associated with its respective ACK/NACK context frame and at least part of the bit stream associated with a previous ACK/NACK context frame. With reference to FIG. 4, ACK/NACK messages $118_{i+1}$, $118_{i+2}$ and $118_{i+3}$ are provided for acknowledgement/disacknowledgement of reception of at least part of the bit stream (i.e., within $DL2_i$, $DL2_{i+1}$ and $DL2_{i+2}$, respectively) associated with their respective ACK/NACK context frames $118_{i+1}$, $118_{i+2}$, and $118_{i+3}$ (respectively), and at least part of the bit stream (i.e., within $DL1_i$, $DL1_{i+1}$ and $DL1_{i+2}$, respectively) associated previous ACK/NACK context frames $118_{i+2}$, $118_{i+1}$, and $118_i$ (respectively).

It will be appreciated by persons skilled in the art that the disclosed technique is not limited to what has been particularly shown and described hereinabove. Rather the scope of the disclosed technique is defined only by the claims, which follow.

The invention claimed is:

1. A method for communicating data transmission units (DTUs) between devices, the DTUs containing a bit stream that is divided among a plurality of discrete physical frames, each physical frame is of a definite number of symbols in duration, each symbol is associated with at least one sub carrier in a plurality of sub carriers, the physical frame is partitioned in time into at least an uplink zone and a downlink zone, the method comprising the procedure of:

allocating, by at least one of said devices, a logical frame in said bit stream, said logical frame having a logical frame start position that is offset from a reference symbol, said reference symbol is selected from said definite number of symbols; and synchronizing reception of said DTUs at a receiver end, according to said logical frame start position;

wherein said logical frame extends in time to coincide with at least part of the duration of said physical frame and at least part of the duration of another physical frame in said plurality of discrete physical frames.

2. The method according to claim 1, further comprising the procedures of:

allocating a media access protocol (MAP) context frame in said bit stream, said MAP context frame having a MAP context frame start position that is offset by a rational number of said symbols from said reference symbol within said physical frame; and providing a MAP message which relates to said MAP context frame, said MAP message includes at least one reference data type that defines said logical frame start position.

3. The method according to claim 1, further comprising the procedures of:

allocating an ACK/NACK context frame in said bit stream, said ACK/NACK context frame having an ACK/NACK start position that is offset by a rational number of said symbols from said reference symbol; and providing an ACK/NACK message for acknowledgement/disacknowledgement of reception of at least part of said bit stream contained at least partly in said physical frame, said ACK/NACK message is associated with at least one respective said ACK/NACK context frame.

4. The method according to claim 1, wherein said another physical frame is a subsequent physical frame in time, to said physical frame.

5. The method according to claim 2, wherein said MAP context frame defines a modulation transmission scheme.

6. The method according to claim 1, wherein the duration of said logical frame is on average, substantially equal to the duration of said physical frame.

7. The method according to claim 2, wherein the duration of said MAP context frame is substantially equal to the duration of said physical frame.

8. The method according to claim 2, wherein said rational number relating to said MAP context frame start position is an integer.

9. The method according to claim 3, wherein said rational number relating to said ACK/NACK context frame start position is an integer.

10. The method according to claim 2, wherein said MAP message further defines a duration of at least one of said uplink zone and downlink zone.

11. The method according to claim 3, wherein said ACK/NACK message is time wise located within either one of:

said uplink zone for acknowledging/disacknowledging of reception of at least part of said bit stream contained at least partly in said downlink zone of said physical frame and said downlink zone of said previous physical frame in said sequence of discrete physical frames; and said downlink zone for acknowledging/disacknowledging reception of at least part of said bit stream contained at least partly in said uplink zone of said physical frame and said uplink zone of said previous physical frame.

12. The method according to claim 2, wherein said MAP context frame defines when transmission parameters take effect.

* * * * *